United States Patent [19]

Miller et al.

[11] Patent Number: 5,011,267
[45] Date of Patent: Apr. 30, 1991

[54] METHOD FOR TILTED ALIGNMENT OF LIQUID CRYSTALS WITH IMPROVED PHOTOSTABILITY

[75] Inventors: Leroy J. Miller, Canoga Park; Willis H. Smith, Jr., Newbury Park; Anna M. Lackner, Los Angeles; J. David Margerum, Woodland Hills, all of Calif.

[73] Assignee: Hughes Aircraft Company, Los Angeles, Calif.

[21] Appl. No.: 919,155

[22] Filed: Oct. 14, 1986

[51] Int. Cl.$^5$ .............................................. G02F 1/13
[52] U.S. Cl. .................................... 350/340; 350/341
[58] Field of Search ................................ 350/340, 341

[56] References Cited

U.S. PATENT DOCUMENTS

| | | | |
|---|---|---|---|
| 3,834,792 | 9/1974 | Janning | 350/341 |
| 3,967,883 | 7/1976 | Meyerhofer et al. | 350/340 |
| 4,022,934 | 5/1977 | Miller | 350/340 |
| 4,030,997 | 6/1977 | Miller et al. | 350/340 |
| 4,196,974 | 4/1980 | Hareng et al. | 350/346 |
| 4,256,377 | 3/1981 | Krueger et al. | 350/340 |
| 4,464,134 | 8/1984 | Lackner et al. | 350/340 |

FOREIGN PATENT DOCUMENTS

| | | |
|---|---|---|
| 3245002 | 6/1983 | Fed. Rep. of Germany . |
| 2815481 | 10/1979 | Japan .................... 350/340 |

OTHER PUBLICATIONS

Wilson et al., "Alignment of LC on Surfaces with Films Deposited Oliquely at Low and High Rates", *Mol. Cryst. Liq. Crystal,* 1983, vol. 94, pp. 359–366.
E. P. Raynes et al., "Liquid Crystal Surface Alignment Treatment Giving Controlled Low angle Tilt", Molecular Crystal Liquid Crystal Letters, vol. 34, 1976, Gordon and Breach Science Publishers Ltd. (New York), pp. 105–110.
Grinberg et al., "Photoactivated Birefringent Liquid Crystal Light Valve for Color Symbology Display", IEEE Transactions on Electron Devices, vol. ED-22, pp. 775–783, Sept., 1975.
W. Urbach et al., "Alignment of Nematics and Smectics on Evaportated Films", Applied Physics Letters, vol. 25, No. 9, Nov. 1974, pp. 479–481.
K. Fahrenschon et al., "Properties of Pretilted Liquid Crystal Structures", J. of Electrochem Society, vol. 124, No. 6, Jun. 1977, pp. 953–955.
D. Armitage, "Alignment of Liquid Crystals on Obliquely Evaporated Silicon Oxide Films", J. Appl. Phys. 51 (5), 1980, pp. 2552–2555.
J. D. Margerum et al., "Effects of Molecular Length on Nematic Mixtures . . .", *Molecular Crystals and Liquid Crystals,* vol. 68, pp. 157–174, (1981).
L. J. Miller et al., "A New Method For Inducing Homeotropic and Tilted Silica Surfaces Alignments of Nematic Liquid Crystals", *Liquid Crystal and Ordered Fluids*, vol. 3, Plenum Pub. Corp., 1978, pp. 513–530.

(List continued on next page.)

*Primary Examiner*—Stanley D. Miller
*Assistant Examiner*—Trong Phan
*Attorney, Agent, or Firm*—V. D. Duraiswamy; W. K. Denson-Low

[57] ABSTRACT

Liquid crystals are induced to assume a uniform tilted alignment in the absence of an applied field by treating the surface of a substrate to provide a desired tilted surface microstructure and free hydroxyl groups. A long chain alcohol having the formula ROH, where R is a carbon chain having at least about 6 carbon atoms therein, is chemically reacted with the tilted surface microstructure and the alkoxy groups derived therefrom are chemically bonded to the microstructure. Subsequently introduced liquid crystals assume a tilted-perpendicular alignment at a tilt angle of about 0.5° to about 6°. The liquid crystals exhibit a significantly greater photostability than has previously been achieved. The microstructure is preferably obtained by depositing sequential layers of $SiO_x$ at medium and shallow grazing angles, where x is from 1 to 2, with the substrate rotated 90° between depositions.

11 Claims, 5 Drawing Sheets

OTHER PUBLICATIONS

M. J. Little et al., "A New Method for Inducing Homogeneous Alignment of Nematic Liquid Crystals", *Liquid Crystal and Ordered Fluids,* vol. 3, Plenum Publishing Corp., 1978, pp. 497–511.

Milo R. Johnson, et al., "Low-Tilt-Angle Nematic Alignment Compatible with Frit Sealing", *IEEE Transactions on electron Devices,* vol. ED -24, No. 7, Jul. 1977, pp. 805–807.

F. Y. Yamagishi et al., "Photochemical and Thermal Stability Studies on a Liquid Crystal Mixture of Cyanobiphenyls", *Liquid Crystals and Ordered Fluids, Pub. Elenum Press,* NY, vol. 3, 1978, pp. 475–496.

W. R. Heffner et al., "Liquid Crystal alignment of Surfactant Treated Obliquely Evaporated Surfaces", *Applied Physics Letters,* 36 (2), Jan. 15, 1980, pp. 144–146.

L. Rousille et al., "Liquid Crystal Quasihomeotropic Orientation Induced by a Polymer Deposited on a SiO Surface", *J. Appl. Phys.* 50 (6), Jun. 1979, pp. 3975–3977.

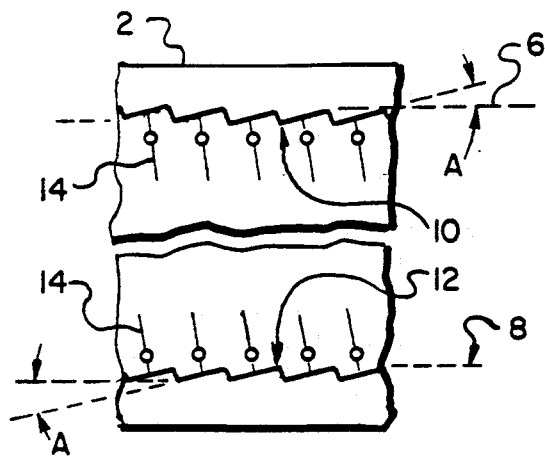
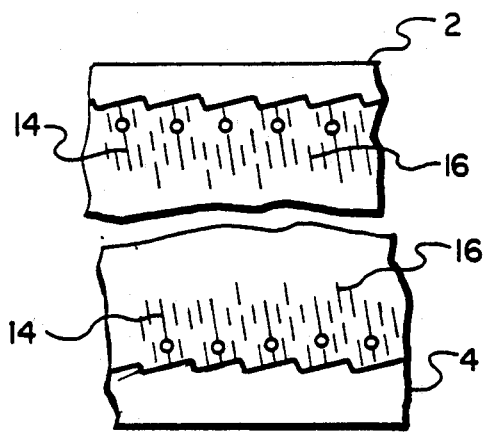
Fig.1.a.  Fig.1.b.
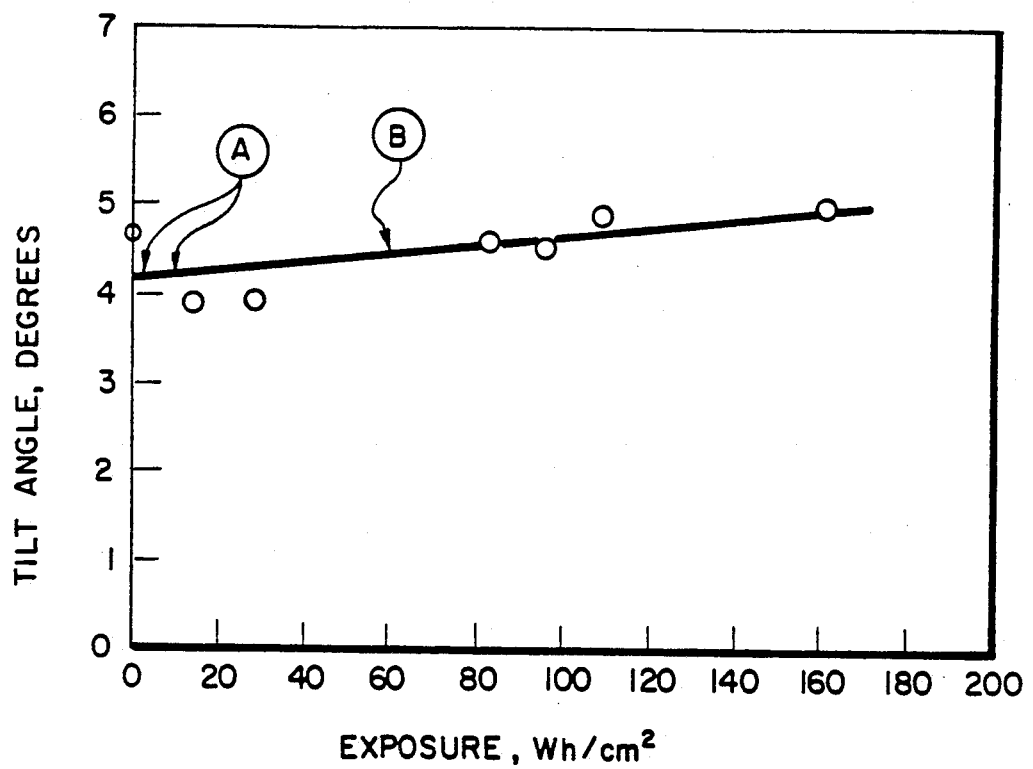
Fig.3.

METHOD FOR TILTED ALIGNMENT OF LIQUID CRYSTALS WITH IMPROVED PHOTOSTABILITY

BACKGROUND OF THE INVENTION

1. Field of the Invention

This invention relates in general to the alignment of liquid crystals in electro-optical devices, and more particularly to the achievement of a stable tilted alignment in liquid crystal light valves.

2. Description of the Related Art

In liquid crystal light valves an input image is converted to an electric field pattern across a liquid crystal cell, and the liquid crystal materials within the cell are rotated in accordance with the local field. The liquid crystal orientation controls the transmission of an output beam from the light valve such that the output beam contains the same spatial information as the input beam, but often in a different format. One of the problems encountered with these devices is that, when the liquid crystals are initially aligned with their directors perpendicular to the cell walls in the absence of an applied field, the direction in which they tilt when a field is applied is somewhat random. Liquid crystals in different areas of the cell may tilt in different directions; this is a phenomenon that can interfere with proper light valve operation, especially in the presence of lateral fields resulting from lateral gradients in the input light intensity.

In an attempt to overcome this problem, liquid crystal cells have been fabricated in which the directors of the liquid crystals are given a slight but uniform pre-tilt in the absence of an electric field. Thus, when a field is applied, the crystals will tilt in the same direction because of their uniform pre-tilt. This technique has achieved good short term results in improving light valve operation, but thus far has suffered from a lack of adequate photostability. When exposed to light for significant periods of time, the tilted alignment deteriorates and the crystals return to a perpendicular alignment in the absence of a field. Thus, while a tilted alignment has been demonstrated to improve light valve operation, the short lifetime of devices which employ this technique has placed a practical limitation on their usefulness.

The desirability of maintaining a liquid crystal pretilt of about 2° to about 6° for a light valve is described in an article by Grinberg, et al., "Photoactivated Birefringent Liquid-Crystal Light Valve for Color Symbology Display", *IEEE Transactions on Electron Devices*, Vol. ED-22, page 775 (1975). This paper also cites the problem of liquid crystal deterioration from ultraviolet and visible light of high intensity.

A prior art technique for achieving a tilted liquid crystal alignment is described in U.S. Pat. No. 4,030,997 by Leroy J. Miller and Jan Grinberg, issued June 27, 1977 and assigned to Hughes Aircraft Company, the assignee of the present invention. This patent describes a technique in which the surface of a substrate is overcoated with a thin layer of $SiO_2$ or other material which has reactive surface hydroxyl groups, and then ion beam etched at a shallow angle. The surface is next treated with a mixture of a long chain aliphatic alcohol having the formula $CH_3(CH_2)_nCH_2OH$, where n ranges from about 2 to about 18, and an aliphatic amine catalyst. The treatment takes place by immersing the substrate in a hot liquid mixture of the alcohol and amine, followed by washing the surface with an inert organic solvent. In this approach the alcohol reacts to convert $SiO_2$ surface hydroxyl groups into alkoxy groups. The liquid crystal tilt angle has been found to be dependent upon the ion beam etching conditions, the length of the alkoxy group bonded to the surface, the liquid crystal mixture used in the cell, and the temperature. Typical photostability lifetimes of cells formed by this method were only about two to four $Wh/cm^2$ of exposure from a xenon arc lamp filtered to give a broad band exposure (385–950 nm) with an intensity of about 150 $mW/cm^2$ on the light valve cell. These cells failed rapidly because the off-perpendicular liquid crystal tilt was rapidly and excessively reduced, e.g., a cell change from an initial tilt of 3° down to 0.4° after only three $Wh/cm^2$ of exposure. The initial tilt angle of the cells also varied substantially with the cell temperature.

Several reports have been made on other techniques for obtaining tilted-perpendicular liquid crystal surface alignment, but none of them disclosed any significant improvement in the photostability of the pre-tilt alignment. An article by W. Urbach et al. in *Applied Physics Letters*, Volume 25, page 479 (1974) describes the use of the surfactant CTAB (cetyltrimethylammonium bromide) on angle-evaporated coatings of SiO to obtain perpendicular or tilted-perpendicular alignment. A CTAB coating is achieved by slowly pulling the plates vertically from the surfactant solution. The CTAB coating on a shallow angled SiO deposition, deposited at a grazing angle of about 15°, gave large off-perpendicular liquid crystal alignment. Small off-perpendicular alignments were achieved for a medium angle SiO deposition deposited at a grazing angle of about 25°, while a perpendicular alignment resulted from SiO deposited at a large grazing angle of about 50°. Because the CTAB is not chemically bonded to the surface, some or even all of it can dissolve in the liquid crystal, depending upon the liquid crystal structure, thickness and temperature. The dissolved CTAB will increase the conductivity of the liquid crystal, which is undesirable for a field-effect device such as tuneable birefringence. Neither the surface nor the dissolved CTAB would be expected to have long term photostability at high radiation intensities.

The use of lecithin or "acid T" as a surfactant dopant for bulk liquid crystals in cells with medium angle deposited SiO (15°–30° off-surface deposition), or with medium angle deposited $MgF_2$ treated surfaces, is described in K. Fahrenschon and M. F. Schiekel, *Journal of the Electrochemistry Society*, Vol. 124, page 953 (1977). The article gives examples of 12° and 16° pre-tilts for the liquid crystals in the tilted-perpendicular cells. The surfactants used are not chemically bonded to the surface, and have not been found to be either thermally or photochemically stable alignment agents, especially for long period, high intensity exposures.

W. R. Heffner, et al., *Applied Physics Letters*, Vol. 36, page 144 (1980) described the use of a silane (DMOAP) and of ultrathin plasma polymerized tetrafluoroethylene (UTPFE) on obliquely deposited silicon monoxide shallow angle deposition-$SiO_x$ surfaces, with a 5° grazing angle, to obtain tilted-perpendicular liquid crystal alignment. Off-normal liquid crystal angles of 16°–20° were reported with the silane/SiO treatment and the liquid crystal CB-7, 20°–35° with an azoxy liquid crystal, and 22°–32° with the UTPFE/SiO treatment and CB-7. Each of these "surfactant" reagents are reported to give well adhered polymer coatings on glass (or SiO)

surfaces, and should be considerably more stable than the CTAB and lecithin surfactants reported above. However, the tilt angles reported by Heffner et al. are too large for liquid crystal light valve usage, and no photostability data were reported.

An article by L. Rousille and J. Robert in *Journal of Applied Physics*, Vol. 50, page 3975 (1979) describes the use of plasma polymerized polytetrafluoroethylene (PTFE) films 20 angstroms thick on medium angle deposited-SiO (30° grazing angle deposition) surfaces. Liquid crystals with about a 3° off-perpendicular tilt were obtained. Thicker PTFE films of 50 angstroms resulted in 0° tilt on the shallow angle deposited-SiO. No photostability or thermal stability lifetime data were reported or discussed.

Techniques for obtaining surface-perpendicular (non-tilted) liquid crystal alignment by forming surface alkoxy groups bonded to the surface by the reaction of long chain alcohols with surface hydroxyl groups are described in U.S. Pat. No. 4,022,934 by Leroy J. Miller, issued May 10, 1977 and U.S. Pat. No. 4,464,134 by Anna M. Lackner et al., issued Aug. 7, 1984, both assigned to Hughes Aircraft Company. The Miller patent describes the reaction of the surface with long chain alcohols by immersing the surface in a hot bath of the alcohol or an alcohol/ amine mixture. The Lackner et al. patent describes an improved technique of reacting the surfaces with long chain alcohols by exposure to hot alcohol vapor. The two patents deal with the achievement of a perpendicular alignment, rather than a tilted alignment. The Lackner et al. patent deals with methods for obtaining substantially perpendicular liquid crystal surface alignment on surfaces which include an oxide coating selected from the group consisting of $SiO_2$, SiO, indium-tin-oxide/$SiO_2$, tin-oxide/ $SiO_2$ and indium/$SiO_2$ mixtures.

Another technique that is relevant to the present invention is reported in an article by Milo Johnson and P. Andrew Penz, "Low Tilt Angle Nematic Alignment Compatible With FRIT Sealing", *IEEE Transactions on Electron Devices*, Vol. ED-24, No. 7, July 1977, pages 805-807. The reported technique is used for tilted surface-parallel liquid crystal alignment. In this technique a combination of medium angle deposition (MAD) and shallow angle deposition (SAD) of $SiO_x$ on a surface with a basically planar macrostructure is used to achieve a tilted surface microstructure having a generally saw-tooth-shaped profile. This technique is used for low tilt homogenous liquid crystal alignment.

Despite the considerable amount of work that has been done in both the treatment of surfaces to obtain tilted microstructures, and in methods for obtaining both tilted and perpendicular liquid crystal orientations, a liquid crystal cell capable of retaining a tilted-perpendicular liquid crystal orientation over extended operating periods in a light valve has not previously been achieved.

SUMMARY OF THE INVENTION

In view of the above problems associated with the prior art, the object of the present invention is to provide a novel and improved surface treatment method and resulting liquid crystal cell in which liquid crystals are oriented at a zero-field tilt angle suitable for light valve operation, and retain the tilt over extended periods of use.

This object is achieved by treating one or both of the opposed surfaces of a liquid crystal cell so as to provide the surfaces with generally aligned microstructures having tilt angles relative to the surface macrostructure which may be inferred to fall within the range of about 0.5° to about 6°, and further providing the surfaces with free hydroxyl groups. The desired microstructure configuration is achieved by MAD and SAD depositions of $SiO_x$, where x is from 1 to 2, with the two depositions oriented approximately 90° to each other. A long chain alcohol is then reacted with the surface and alkoxy groups are chemically bonded to the tilted surface microstructures, the alcohol molecules having the formula ROH, where R is a carbon chain having from about 6 to about 24 carbon atoms. The alcohol may be mixed with an amine, and is preferably bonded to the tilted surface microstructure by exposing the surface to the alcohol vapor. The substrate itself is preferably formed from $SiO_x$. Liquid crystals introduced into the prepared cell are aligned by the alkoxy groups to achieve the desired zero-field tilt. Cells formed in this manner have been found to exhibit a much higher degree of tilt photostability than in previous techniques.

These and other features and advantages of the invention will be apparent to those skilled in the art from the following detailed description of preferred embodiments, taken together with the accompanying drawings, in which:

DESCRIPTION OF THE DRAWINGS

FIGS. 1a and 1b are illustrative fragmentary drawings of a portion of a liquid crystal cell formed in accordance with the invention, with FIG. 1a illustrating the microstructure of the interior cell surface and the orientation of alkoxy groups bonded thereto, and FIG. 1b illustrating the orientation of later added liquid crystals;

FIG. 3 is a graph illustrating the photostability of the liquid crystal tilt angle;

FIG. 7 is a graph showing the tilt angle and contrast ratio as a function of SAD $SiO_2$ thickness for a particular example.

DETAILED DESCRIPTION OF PREFERRED EMBODIMENTS

Figure 2:
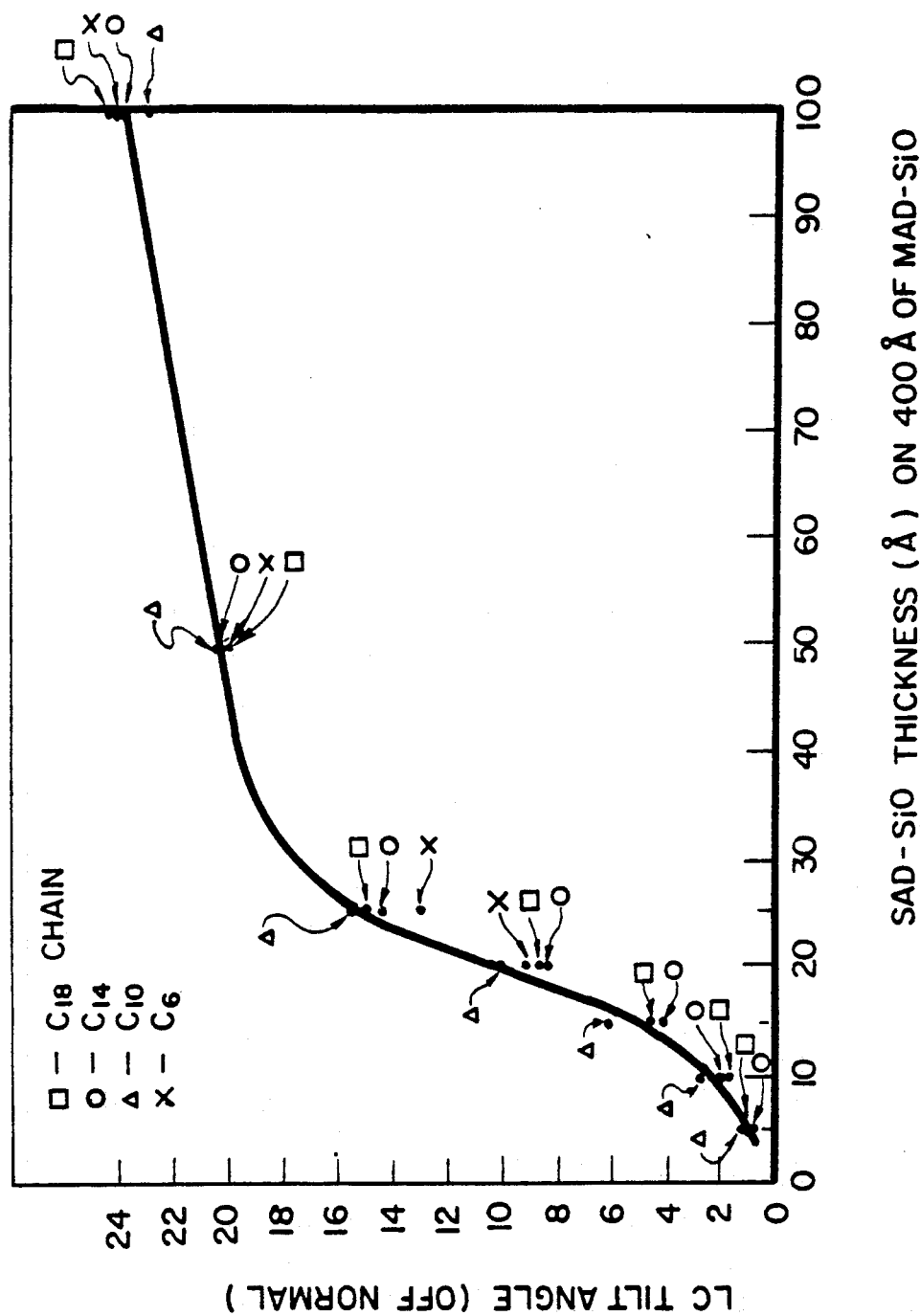
FIG. 2 is a graph illustrating the effects of SAD SiO deposition thickness and alcohol chain length on the liquid crystal tilt angle for one example.

A uniform, stable, tilted alignment of liquid crystals on the surfaces of devices used for electro-optical applications has been achieved which is particularly useful in providing photostability in liquid crystal light valve cells, such as those used for projection displays. The general approach is illustrated in FIG. 1a, in which members 2 and 4 are opposed walls in a liquid crystal cell, which is shown empty of liquid crystals. The walls generally have a coating of silicon oxide, e.g., $SiO_x$, where x is from 1 to 2. The interior surfaces of the opposed walls generally lie in parallel planes indicated by dashed lines 6 and 8, with a generally smooth macrostructure. The two surfaces are treated, however, to produce tilted surface microstructures having generally saw-toothed profiles 10, 12. The precise surface topography of the microstructure has not been measured. However, because the liquid crystal later added to the cell has a tilt angle within the range of about 0.5° to about 6°, it can be inferred that the surface of the microstructure is tilted from the macrostructure plane by an angle A which lies in a similar range of about 0.5° to about 6°. Significantly smaller tilt angles can result in the loss of effective liquid crystal tilt due to lateral electric fields from an applied image pattern, while significantly greater tilt angles can degrade the contrast achieved. Of course there is not an abrupt cutoff at either 0.5° or 6°, but rather a gradual transition.

Long chain alcohol molecules are reacted with each surface and long chain alkoxy groups are chemically bonded to each surface. Although there is uncertainty as to the exact surface molecular structure, the bonding can be illustrated as in FIG. 1a with the alkoxy groups 14 oriented perpendicular to the tilted microstructure.

The situation after a thin layer of liquid crystals, typically about 4–8 microns thick, has been added to the cell is illustrated in FIG. 1b. The liquid crystals 16 conform to the orientation of the long chains, aligning perpendicular to the microstructure and thus at a uniform tilt angle to the macrostructure surface. Whereas the photodegradation of liquid crystals in the presence of other surfaces has been observed to cause a more perpendicular alignment, apparently as a result of the interaction between the degradation products and the surface, the arrangement of FIG. 1b has surprisingly been found to produce an unusually high photostability of the tilted-perpendicular liquid crystal alignment. Although the explanation for this phenomenon is still under study, it is believed to result not from the outright prevention of liquid crystal photoproducts due to decomposition during light exposure, but rather from such photoproducts becoming attached to the microstructure surface with the same directionality as the alkoxy chains. Accordingly, they do not significantly alter the tilted alignment relative to the macrosurface.

The saw-toothed microstructure profile is preferably obtained by a two-step process in which a layer of MAD-SiO$_x$ is first deposited on the substrate (x is from 1 to 2), preferably by thermal evaporation in a vacuum system, at about a 20°–40° grazing angle, (preferably a MAD grazing angle of about 30°). The substrate is then rotated 90°, and a second layer of SAD-SiO$_x$ is deposited, at a grazing angle of about 2°–10°, (preferably a SAD grazing angle of about 5°), on top of the first layer, thus orienting the two depositions at approximately 90° to each other. Alternately, the first deposition can be a SAD of SiO or SiO$_2$, followed by a MAD of SiO or SiO$_2$, with an appropriate adjustment in the thicknesses of the two layers. In FIG. 1a, with the MAD preceding the SAD, the SAD would be applied from the left for upper substrate 2, and from the right for lower substrate 4.

Other techniques may be available to obtain the desired tilted surface microstructure. For example, although it has not been demonstrated in this context, it may be possible to form a suitable holographic blazed grating on the cell wall surface to achieve the desired saw-toothed topography. Whatever method is used to obtain the microstructure, free hydroxyl (OH) groups should be present at the microstructure surface to bond with the long alkoxy chains.

In FIGS. 1a and 1b the microstructures for the upper and lower substrates are generally parallel. In certain cases it may also be possible to have the two microstructures with different degrees of tilt, or by forming the tilted microstructure for only one of the substrates. Under appropriate conditions this may be enough to tilt the liquid crystal throughout the cell.

After the desired microstructure surface topography has been achieved, a long chain alcohol is brought into contact with the surface and chemically bonded to the free hydroxyl groups. The alcohol molecules have the formula ROH, where R is a carbon chain having from about 6 to about 24 carbon atoms therein. The molecules may be either pure aliphatic chains, or may include aromatic rings within the chain. It is possible that modified carbon chains, such as branched chains or chains with additional substances such as oxygen, nitrogen or fluorine, might also work, but this is not known at present. Chains having less than about 6 carbon atoms will generally have too great a tilt angle for practical light valve applications, are temperature sensitive, and are not as photostable as desired. Although in theory there is no upper limit to the length of the chains, chains with more than 24 carbon atoms are quite expensive. For some liquid crystals (e.g., certain Schiff base mixtures), the number of carbon atoms can be as small as 6, or possibly even less for marginally acceptable alignment. For others, the number of carbon atoms must be 14–18 or more.

The substrates are preferably exposed to the long chain alcohol in a heated vapor phase, as in U.S. Pat. No. 4,464,134, or they can be dipped into a molten alcohol and then washed as in U.S. Pat. Nos. 4,022,934 and 4,030,997. With the vapor process, the vapor pressure will decrease at a given temperature as the number of carbon atoms in the chain increases, and the rate of reaction with the substrate surface will decrease as the vapor pressure decreases. Octadecanol, with 18 carbon atoms, is satisfactory in most cases and is considered to be the alcohol of choice.

The choice of the thicknesses of MAD and SAD-SiO$_x$ layers depends upon the desired liquid crystal tilt angle and the particular liquid crystal being aligned. The resultant tilt appears to result from the topographical effect of the long chain alcohol on the treated surface, and does not depend greatly upon the chain length of the longer chain alcohols, as opposed to the U.S. Pat. No. 4,030,997 method in which the tilt angle varies with the chain length of the alcohol used for the bonded alkoxy group.

The following examples are provided to illustrate the practice of the invention.

EXAMPLE 1

Substrates were prepared by thermal evaporation of SiO on ITO (indium tin oxide) coated glass, using a grazing angle of 30° for the MAD-SiO, rotating the substrate 90°, and then depositing the SAD-SiO at a grazing angle of 5°. Various chain length alcohols were reacted with the surface using a bath of the alcohol mixed with an equal weight of hexadecylamine, as described in U.S. Pat. No. 4,030,997. The bath temperatures were 150° C. (sample in reflux area) for C$_6$H$_{13}$OH, and 115°–117° C. (sample immersed) for the other alcohols (C$_{10}$H$_{21}$OH, C$_{14}$H$_{29}$OH and C$_{18}$H$_{37}$OH). The liquid crystal was a 2:1 (by weight) mixture of the Schiff base liquid crystals known as EBBA and MBBA.

The MAD-SiO coating was 400 angstroms thick. The liquid crystal tilt angle which resulted from various thicknesses for the SAD-SiO coating and also from the various alcohol chain lengths are shown in FIG. 2. As indicated, the tilt angle varied approximately linearly from about 2° to 15° in the range of SAD-SiO thickness from 10 angstroms to 25 angstroms. With SAD-SiO thicknesses between 25 angstroms and 100 angstroms, the tilt angle gradually levelled off and reached only about 24°. These liquid crystal tilts were essentially independent of the chain length of the alcohol bonded to the surface, except that the $C_6H_{13}OH$ alcohol did not show good alignment on less than 20 angstroms of SAD-SiO. The $C_{10}$, $C_{14}$ and $C_{18}$ alcohols all gave liquid crystal tilt angles in the desired range of about 2° to about 6° for liquid crystal light valves with SAD-SiO thicknesses of 10–15 angstroms.

The tilt angles obtained were about an order of magnitude less sensitive to temperature changes than in the prior tilted alignment method disclosed in U.S. Pat. No. 4,030,997, in which the tilt was controlled by the length of the alcohol chain bonded to an ion beam etched $SiO_2$ surface. A temperature coefficient for the tilt angle of −0.045° tilt per 1° C. was measured over the range of 22°–50° C. for the liquid crystal aligned on MAD/SAD-SiO (400/15 angstroms thicknesses) treated with a $C_{14}$ chain length alcohol. The tilt angle decreased as the temperature increased, but over the entire temperature range the liquid crystal remained within the desired tilt range of about 2°–6°. This low temperature coefficient is of considerable value in that it permits the operation of liquid crystal light valves over a wide temperature range.

FIG. 3 shows the tilt angle response to long exposures of the liquid crystal to intense light from a xenon arc lamp. The exposure levels indicated in callout A show the much shorter photostability lifetime of tilted alignment achieved with the same type of liquid crystal by the method of Pat. No. 4,030,997. With this prior method, two ion beam etched electrodes had been treated with $C_8$ and $C_9$ alcohols, respectively, to obtain the beginning tilt. The cells had a very short photostability lifetime, such that short period exposures (with a 385 nm cutoff filter and intensities of 144–166 mW/cm$^2$) caused their tilt angle to decrease to a level that was too low to maintain a single tilt domain in the cell under an applied field.

Callout B indicates the photostability lifetime for a prior hybrid field effect (HFE) cell exposed under similar, but lower intensity, conditions. Details of the exposure conditions for the prior cell are provided in an article by F. G. Yamagishi et al., "Photochemical and Thermal Stability Studies on a Liquid Crystal Mixture of Cyanobiphenyls", *Liquid Crystals and Ordered Fluids*, Vol. 3, pages 475–496 (1978).

An important observation made on the liquid crystal taken from one of the tilted-perpendicular cells of this example after its exposure of 163 Wh/cm$^2$ was that its clearpoint had decreased by about 10° C. This indicates that an impurity level greater than 3%, probably in the range of 5–15%, was formed by its exposure to the light, without causing serious tilt angle variation within the cell. This demonstrates that the tilted-perpendicular surface alignment of the present invention is unusually insensitive to the formation of photodecomposition products in the liquid crystal. In contrast, photodecomposition products of only about 0.1% caused tilt angle realignment defects in the Yamagishi et al. report.

EXAMPLE 2

Figures 4, 5:
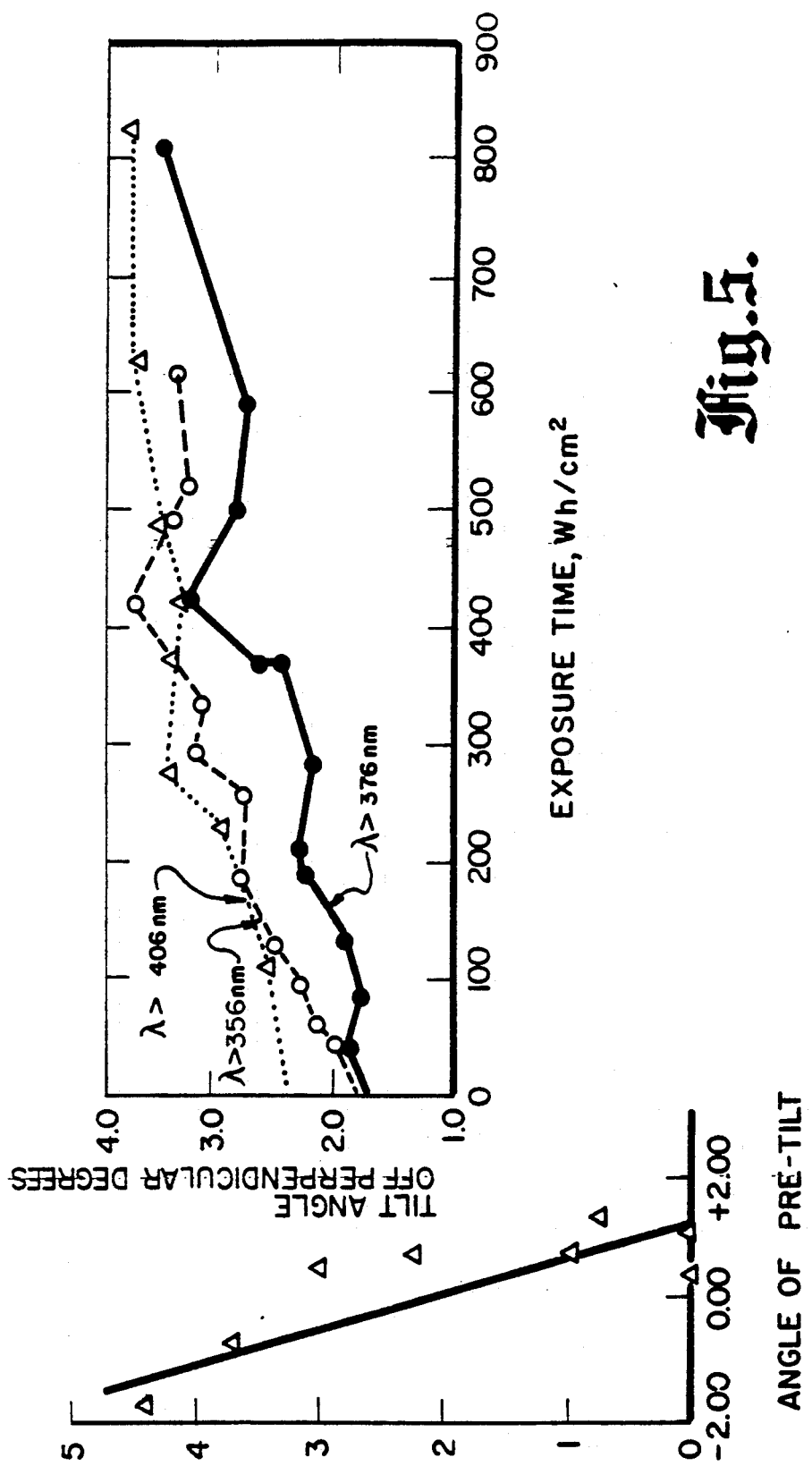
FIG. 4 illustrates the liquid crystal tilt angle as function of the SAD $SiO_2$ thickness for another example.
FIG. 5 is a graph showing the tilt angle photostability of one example for exposures to different portions of the electromagnetic spectrum.

Controlled tilt angles were obtained with the phenyl cyclohexanecarboxylate liquid crystal mixture HRL-6N7 using MAD/SAD-SiO$_2$ coatings treated with a $C_{18}$ long chain alcohol. This liquid crystal is a short molecular length, low viscosity, negative dielectric anisotropy mixture whose composition is disclosed in an article by J. D. Margerum et al., "Effects of Molecular Length on Nematic Mixtures/Anisotropic and Dynamic Scattering Properties of 4-Alkoxyphenyl 4-Alkylcyclohexanecarboxylate Mixtures", *Molecular Crystals and Liquid Crystals*, Vol. 68, pages 157–174 (1981). As shown in FIG. 4, only about 4–5 angstroms of E-beam evaporated SAD-SiO$_2$ on 55 angstroms of MAD-SiO$_2$, followed by alcohol treatment, was required to give a tilt of 1°–2° off normal. The substrates were prepared by ion beam sputtering of about 2,000 angstroms of SiO$_2$ on ITO-coated glass, followed by E-beam heated thermal evaporation of SiO: using a grazing angle of 30° for the MAD-SiO$_2$, rotating the substrate 90°, and then depositing the SAD-SiO$_2$ at a grazing angle of 5°. The $C_{18}H_{37}OH$ alcohol was bonded to the surface by the vapor phase method of U.S. Pat. No. 4,464,134 by placing a few tiny crystals of the alcohol alongside the substrates in a covered petri dish, and heating the dish in an oven at 140° C. for two hours. The substrates were then washed with solvent, assembled into test cells with a 0.5 mil spacing between substrates, followed by introduction of the liquid crystal.

The photostability of the liquid crystal for various exposure wavelengths is shown in FIG. 5. The tests were principally accelerated lifetime tests with considerable amounts of near ultraviolet light present in the intense exposure light from xenon arc lamps. The data in FIG. 5 shows that the tilt angle changed only slightly in three liquid crystal-type test cells, which were exposed while a voltage was applied to the cells. The test cells were each made with two transparent substrates, and the exposures were made with a reflective mirror immediately behind each cell. The exposure conditions were similar to those described in the Yamagishi et al. article mentioned previously. The cells of the present invention lasted much longer than HFE test cells containing BDH-E7 exposed with similar intensities and cutoff filters. The lifetimes for HRL-6N7 with the shorter wavelength cutoff filters of 356 nm and 376 nm were better than those obtained with Merck-1132 liquid crystal, which is among the most stable of the HFE liquid crystal materials.

Figure 6:
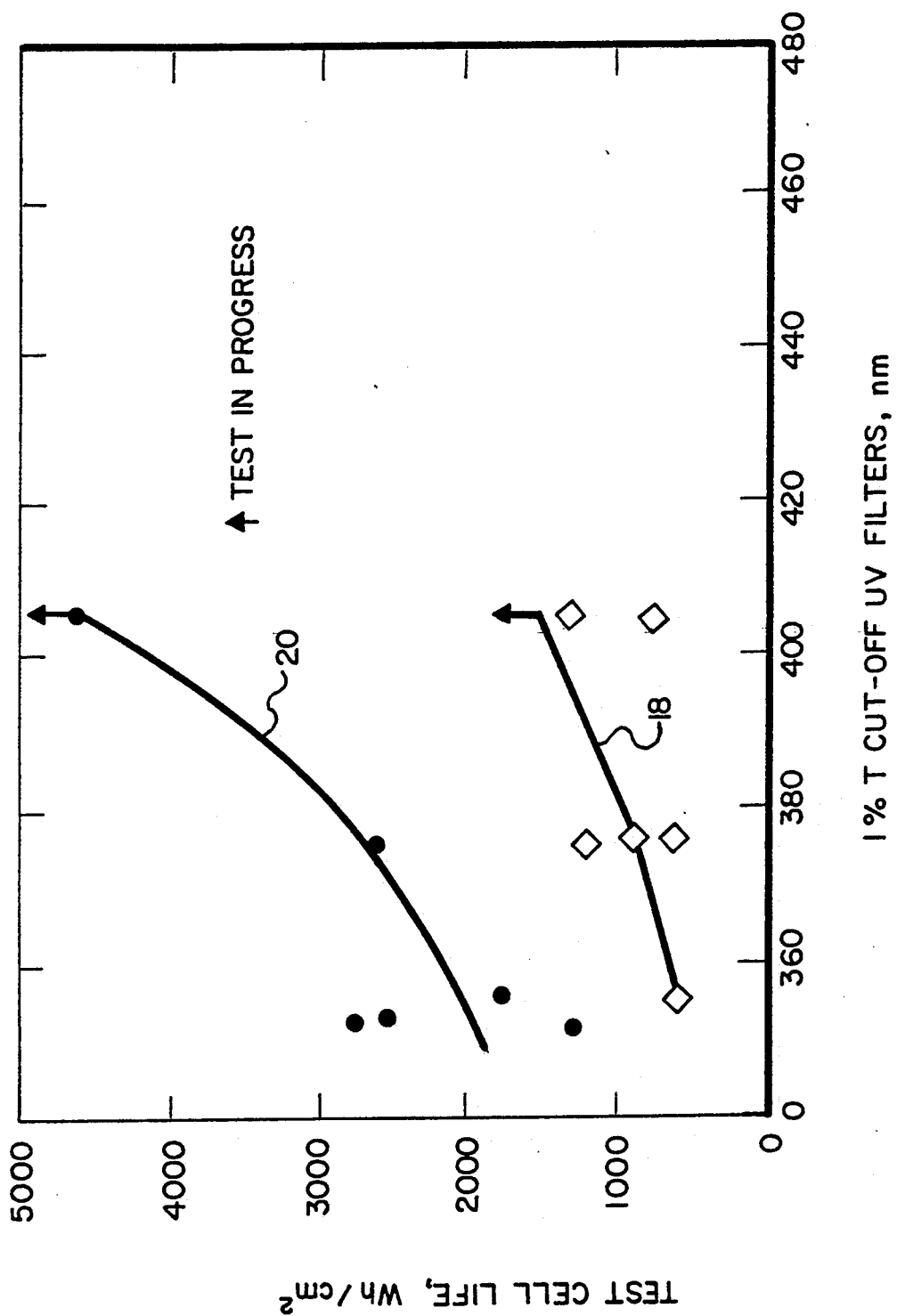
FIG. 6 is a graph illustrating the test cell life response to different exposure conditions for two different liquid crystal samples.
Figure 2:
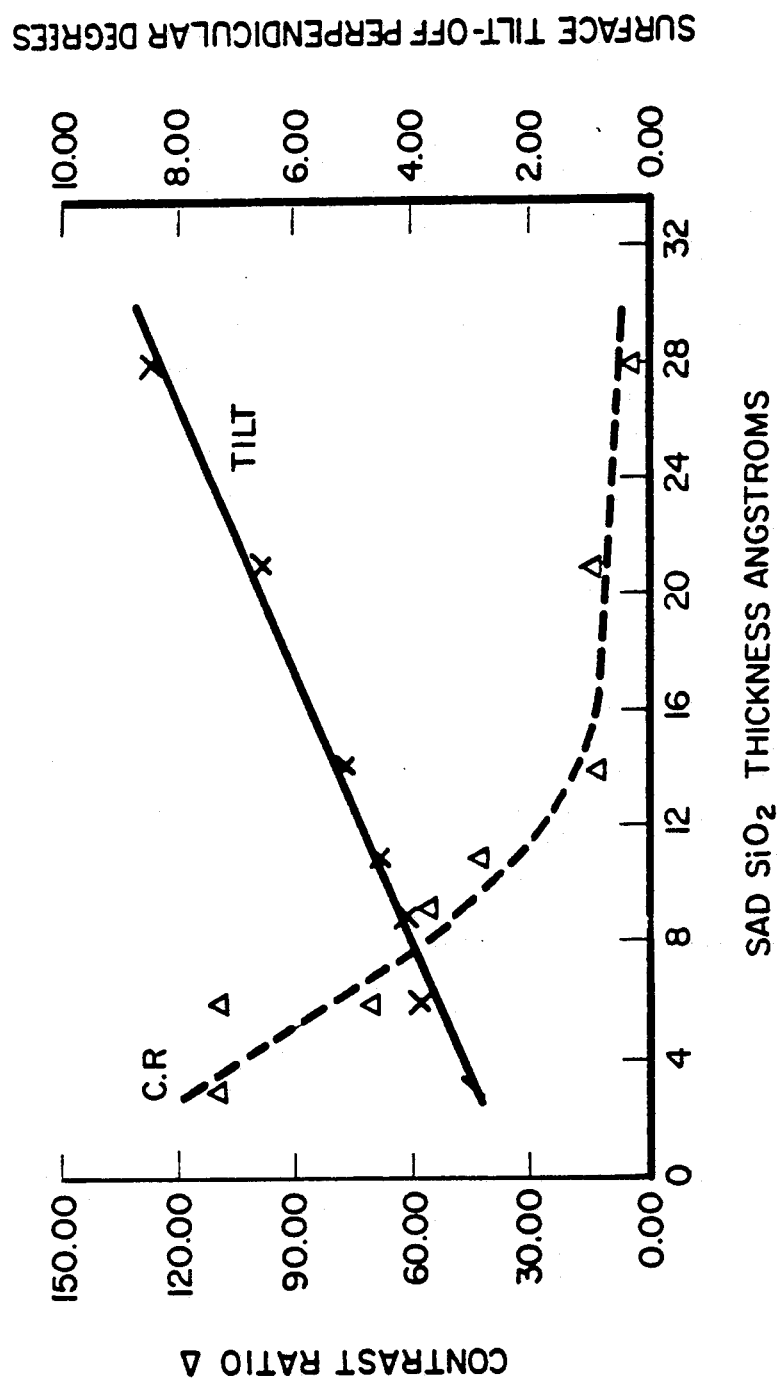

Additional results on the photostability using HRL-6N7 are summarized in the lower trace 18 of FIG. 6. Cell life was measured with ultraviolet filters having various cutoff wavelengths (cutoff was deemed to occur when the filter transmission dropped to 1% or less). Some of the cells sealed with optical cement showed about double the lifetime as at the short wavelength cutoff of 356 nm, indicating that even longer exposure lifetimes may be expected for sealed cells at longer cutoff wavelengths, such as the 397 nm cutoff required for blue liquid crystal light valves.

EXAMPLE 3

Tilted-perpendicular substrate alignment studies were also made with liquid crystal provided by E. Merck Company as its ZLI-2857 mixture. The substrates were fabricated by $C_{18}$ alcohol vapor treatment of glass coated with ITO and SiO$_2$ (or Si$_3$N$_4$) before MAD/SAD-SiO$_2$ layers were deposited on the surface. The effect of various thicknesses of SAD-SiO$_2$ on a fixed thickness of MAD-SiO$_2$, prior to the $C_{18}$ alcohol treatment, is shown in FIG. 7. This figure also shows the effect of the tilt angle on the contrast ratio in a particular projection display system. A small tilt of 1°-4° gave the highest contrast display, and this range of pre-tilt was large enough to prevent the occurrence of image-induced alignment mode defects in the projection pictures.

The results of photostability studies are indicated in trace 20 of FIG. 6. The exposures were carried out under conditions similar to those for the HRL-6N7 tests in Example 2. The results show a very high photostability, with longer photostability lifetimes than any other cells tested. In addition, the end of life for the cells corresponded to non-uniformities observed electro-optically in the on-state with voltage applied; no alignment defects were observed in the off-state.

Analysis of liquid crystals removed from the cells after the exposure tests showed that substantial compositional changes had taken place in the liquid crystal during the exposures. In each case the clearpoint had increased substantially, and gas chromatographic analysis showed the presence of about 3% impurity, as well as changes in the ratios of the initial components. These results confirm that the tilted-perpendicular alignment of the present invention is unusually insensitive to the formation of photodecomposition products and to changes in the composition of the liquid crystal. Substantial compositional changes would have occurred in these cells well before the final period of exposure. Since the electro-optical response of the cells did not show any substantial degradation until after the final exposure period, the cells evidently operated satisfactorily with substantial amounts of photo-induced impurities present. It took an unusually large buildup of photodecomposition products and effects to end the cell lifetimes.

This invention is intended primarily for liquid crystal light valves, but may also be adapted for use with other electro-optical devices in which a tilted liquid crystal alignment is desirable. While specific examples have been described, it should be understood that numerous variations will occur to those skilled in the art.

Accordingly, it is intended that the invention be limited only in terms of the appended claims.

We claim:

1. A method of preparing a liquid crystal cell having a pair of opposed surfaces and exhibiting an improved photostability and temperature insensitivity, comprising:

treating at least one surface of the opposed cell surfaces to provide generally aligned tilted surface microstructures with free hydroxyl groups located thereon, said step of treating comprising:

a. depositing a first layer of $SiO_x$ on said at least one surface at a medium grazing angle, wherein x ranges from 1 to 2;

b. rotating said at least one surface by 90° and c. depositing a second layer of $SiO_x$ on said first layer at a shallow grazing angle;

chemically reacting said microstructures with a long chain alcohol to bond long chain alkoxy groups to said microstructures at the location of the free hydroxyl groups, the alcohol having the formula ROH, where R is a carbon chain having at least about 6 carbon atoms therein, the treatment of the opposed cell surfaces and the minimum length of the carbon chain being selected to yield a tilted-perpendicular alignment for the alkoxy groups substantially independent of the carbon chain length in the approximate tilt angle range of 0.5°-6°;

introducing liquid crystal material into said cell so that the liquid crystal has substantially the same alignment as the long chain alkoxy groups, the alignment being retained in the presence of photodecomposition, 2. The method of claim 1, wherein said medium grazing angle is about 30° and said shallow grazing angle is about 5°.

3. The method of claim 1, wherein said alkoxy group derived from the long chain alcohol is bonded to the tilted surface microstructures by exposing the surfaces to alcohol vapors.

4. The method of claim 1, wherein the long chain alcohol is mixed with an amine.

5. The method of claim 1, wherein the aliphatic carbon chains have from about 6 to about 24 carbon atoms therein.

6. A method of treating the surface of a substrate to induce liquid crystals subsequently brought into the vicinity of the surface to orient themselves at a substantially uniform tilt angle to the surface, and to retain the liquid crystal tilt angle over extended light exposure periods and temperature variations, comprising:

depositing first and second layers of $SiO_x$ on the surface at respective medium grazing angle on the order of 20°-40° and shallow grazing angle on the order of 2°-10° to form tilted surface microstructures on the surface, where x is from 1 to 2, the layers being deposited at grazing angles which are shifted by approximately 90° to each other, and chemically reacting the deposited layers on said tilted surface microstructures with long chain alcohol molecules having the formula ROH, where R is a carbon chain having from about 6 carbon atoms to about 24 carbon atoms, therein, said $SiO_x$ layers being deposited and the length of said carbon chain being selected to tilt subsequently introduced liquid crystals at a tilted-perpendicular angle within the approximate range of 0.5°-6°, said tilted-perpendicular angle of the liquid crystal being retained after along period exposures.

7. The method of claim 6, wherein the alcohol molecules are reacted with the deposited layers in a vapor state.

8. The method of claim 6, wherein the surface is a silicon oxide.

9. The method of claim 6, wherein the long chain alcohol is mixed with an amine.

10. A method of preparing a liquid crystal cell having a pair of opposed surfaces so that liquid crystals subsequently introduced into the cell will align with a substantially uniform tilt in a tilted-perpendicular alignment between the surfaces in the absence of an applied field, and will exhibit an improved photostability and temperature insensitivity, comprising:

treating the opposed cell surfaces to provide generally aligned tilted surface microstructures with free hydroxyl groups thereon, said step of treating comprising the steps of depositing first and second layers of $SiO_x$ on each surface at a medium grazing angel on the order of 20°-40° and at a shallow razing angle on the order of 2°-10°, respectively, where x is from 1 to 2, the first and second layers being deposited at grazing angles which are shifted by approximately 90° to each other, and chemically bonding alkoxy groups to the tilted surface microstructures such that said liquid crystals subsequently introduced into the cell align at a tilted-perpendicular angle to the cell surfaces in the approximate range of 0.5°–6°.

11. The method of claim 10, wherein said shallow grazing angle is about 5° and said medium grazing angle is about 30°.

* * * * *

UNITED STATES PATENT AND TRADEMARK OFFICE
CERTIFICATE OF CORRECTION

PATENT NO. : 5,011,267
DATED : April 30, 1991
INVENTOR(S) : Leroy J. Miller, et al It is certified that error appears in the above-indentified patent and that said Letters Patent is hereby corrected as shown below:

Col. 10, line 44, delete "along" and insert --long--.

Col. 10, linne 65, delete "razing" and insert --grazing--.

Signed and Sealed this

Fifth Day of October, 1993

*Attest:*

BRUCE LEHMAN

*Attesting Officer*   Commissioner of Patents and Trademarks